United States Patent [19]

Brady et al.

[11] 4,251,575

[45] Feb. 17, 1981

[54] CHEMICAL TREATMENT OF POLY(ARYLENE SULFIDE)-CONTAINING ARTICLES

[75] Inventors: Donnie G. Brady; Ralph P. Williams; Harold W. Hill, Jr., all of Bartlesville, Okla.

[73] Assignee: Phillips Petroleum Company, Bartlesville, Okla.

[21] Appl. No.: 519,566

[22] Filed: Oct. 31, 1974

[51] Int. Cl.³ .............................................. B05D 3/10
[52] U.S. Cl. .................................. 427/341; 427/400; 427/393.5; 528/388; 528/486; 528/488; 528/490
[58] Field of Search .................... 427/341, 400, 385 B, 427/393.5; 260/79; 8/115.6; 528/388, 486, 488, 490

[56] References Cited

U.S. PATENT DOCUMENTS

| 2,720,440 | 10/1955 | Wallace | 528/486 |
|---|---|---|---|
| 2,751,277 | 6/1956 | Coover et al. | 528/486 |
| 3,793,256 | 2/1974 | Scoggin | 260/79 |
| 3,817,936 | 6/1974 | Jones et al. | 260/79 |
| 3,839,301 | 10/1974 | Scoggins | 260/79 |
| 3,856,560 | 12/1974 | Blackwell | 260/79 |
| 3,869,434 | 3/1975 | Campbell et al. | 260/79 |
| 3,884,883 | 5/1975 | Moberly | 260/79 |
| 3,948,865 | 4/1976 | Brady et al. | 528/388 |

*Primary Examiner*—Ronald H. Smith
*Assistant Examiner*—Janyce A. Bell

[57] ABSTRACT

The high temperature properties of an article having at least a portion of its surface formed of an arylene sulfide polymer is improved by treating such article with a treating agent selected from the group consisting of hydrogen peroxide, an alkali metal or alkaline earth metal hypochlorite, sulfuric acid, chlorine, sulfuryl chloride, nitrogen dioxide, chromium trioxide, alkali metal permanganates and nitric acid under conditions of concentration of treating agent, time and temperature to effect the desired improvement. Treated articles such as coated substrates and moldings exhibit increased high temperature surface hardness. Articles such as fibers, yarns, fabrics and films exhibit infusibility at 700° F. (371° C.).

7 Claims, No Drawings

CHEMICAL TREATMENT OF POLY(ARYLENE SULFIDE)-CONTAINING ARTICLES

This invention relates to arylene sulfide polymer coatings and molded articles having improved properties.

In the years following their initial development, poly(arylene sulfide) resins have become commercially important and the products produced therefrom are finding increasing utility due to their outstanding durability, toughness, inertness and versatility. To extend the value of such poly(arylene sulfide) resins and the utility of products prepared therefrom, still further improvements have been sought with regard to improving the properties of formed products and coated articles to meet the requirements of certain applications.

The present invention provides an improvement by which articles of manufacture which have been molded from, formed from or coated with a poly(arylene sulfide) resin exhibit improved high temperature properties. Specifically, the present invention provides an improvement in the surface of such articles including an increase in high temperature hardness. Still another improvement is that formed articles such as films, fibers, yarns, braids, and fabrics are rendered infusible.

Accordingly, it is an object of this invention to provide a process for improving the properties of an article having at least a portion of the surface thereof formed of an arylene sulfide polymer.

Another object is to provide a process for increasing the surface hardness of an arylene sulfide polymer coating on a substrate.

Yet another object is to provide a process for increasing the surface hardness of an article molded from an arylene sulfide polymer.

A further object is to provide a process for rendering infusible films and fibers formed from an arylene sulfide polymer.

Other objects, aspects and advantages of this invention will be readily apparent to those skilled in the art from the reading of the following disclosure.

In accordance with the present invention it has been discovered that the properties of an article having at least a portion of the surface thereof formed of an arylene sulfide polymer can be improved by treating such article with a treating agent selected from the group consisting of hydrogen peroxide, an alkali metal or alkaline earth metal hypochlorite, sulfuric acid, chlorine, sulfuryl chloride, nitrogen dioxide, chromium trioxide, alkali metal permanganates and nitric acid under conditions of concentration of treating agent, time and temperature to effect the desired improvement.

In one embodiment, the present invention provides a process for increasing the surface hardness of an arylene sulfide polymer coating on a substrate which comprises treating the coated article with one of the above-listed treating agents under conditions sufficient to effect the desired improvement.

In another embodiment, the present invention further provides a process for increasing the surface hardness of a rigid molding molded from an arylene sulfide polymer which comprises treating the molded article with one of the above-listed treating agents. By the term "rigid molding" is meant an article of manufacture having a cross-sectional thickness of at least 10 mils and fashioned by conventional molding techniques such as compression-molding, injection-molding, free-sintering molding and the like, from unfilled resins or resins containing reinforcing fillers such as glass fibers, abestos fibers and the like.

In yet another embodiment, the present invention provides a process for rendering infusible films, fibers, yarns, braids, fabrics and the like formed from an arylene sulfide polymer which comprises treating the formed article with one of the above-listed treating agents. The term "infusible" as used herein and in the claims is intended to mean that the treated article is nonmelting when heated to 700° F. (371° F.).

The treating fluids which are suitable for use according to this invention are selected from the following:

1. Hydrogen peroxide. The hydrogen peroxide can be dissolved in glacial acetic acid, water or mixtures thereof. It is employed at a concentration ranging from 0.5 weight percent of the solution up to a saturated solution. Preferably the concentration is from 2 to 30 weight percent. A presently preferred solvent for the hydrogen peroxide is acetic acid containing a minor amount of water.
2. Alkali metal or alkaline earth metal hypochlorites. The hypochlorite is employed at a concentration ranging from 0.5 weight percent to saturated, in water solution; preferably at a concentration of from 1 to 20 weight percent. The presently preferred hypochlorite is sodium hypochlorite.
3. Sulfuric acid. Sulfuric acid can be employed at a concentration ranging from 100 percent to 90 percent in water solution.
4. Chlorine. Chlorine can be employed either as a gas or in liquid solution:
    a. Gaseous chlorine can be employed at a concentration ranging from essentially anhydrous chlorine gas to chlorine gas saturated with water vapor.
    b. Chlorine can be employed in either water or acetic acid solution at a concentration ranging from 0.1 weight percent to a saturated solution.
5. Sulfuryl chloride. Sulfuryl chloride can be employed in solution in an inert solvent at a concentration ranging from 50 to 100 weight percent sulfuryl chloride. Any solvent inert to sulfuryl chloride under the conditions of treatment can be employed, as for example, halogenated hydrocarbons.
6. Nitrogen dioxide.
7. Chromium trioxide. Chromium trioxide is employed in water solution at a concentration ranging from 0.5 weight percent to a saturated solution.
8. Alkali metal permanganates. The alkali metal permanganates are employed in water solution at a concentration ranging from 0.5 weight percent to a saturated solution.
9. Nitric acid. Nitric acid is employed at a concentration ranging from 35 to 70, preferably 50 to 70, weight percent in water solution.

Due to their ready availability and ease of handling, the presently preferred treating fluids are those containing hydrogen peroxide, sodium hypochlorite or elemental chlorine.

Poly(arylene sulfide) resins which are applicable for the composition of the coatings and articles which can be treated according to the process of the present invention are those resins which are solid, have a melting point of at least about 150° F. and are insoluble in common solvents. Such resins can be conveniently prepared by the process disclosed in U.S. Pat. No. 3,354,129 to Edmonds et al. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene sulfide).

The resulting polymer contains the aromatic nucleus of the polyhalo-substituted monomer coupled in repeating units through a sulfur atom. The polymers which are preferred for use according to this invention are those polymers having the repeating unit —R—S— where R is phenylene, biphenylene, naphthylene, or a lower alkyl-substituted derivative thereof. By "lower alkyl" is meant alkyl groups having one to six carbon atoms such as methyl, propyl, isobutyl, n-hexyl and the like.

The term poly(arylene sulfide) is meant to include not only homopolymers but also normally solid arylene sulfide copolymers, terpolymers and the like.

The poly(arylene sulfide) resins can be blended, before coating, molding, extruding, melt-spinning, etc., with suitable amounts of other materials such as pigments, glass fibers, asbestos fibers, other resins and the like. Poly(arylene sulfide) resins which are particularly suitable for use as release coatings on cookware can contain from 0 to 50 weight percent of titanium dioxide and/or 0 to 50 weight percent of polytetrafluoroethylene (PTFE) powder, based on the resin.

The molded, formed or coated articles which are treated according to the present invention are manufactured using the resins described above. Before manufacturing the articles, the resins can optionally have been subjected to any suitable modifying pre-treatment to render them more suitable for the forming or coating process or to modify the properties of the molded or coated products. Such pre-treatment can have included conventional thermo-curing of the resin by heating the resin at elevated temperatures in air. Similarly, the resins can have been subjected to a chemical treatment closely related to and using the treating agents of the process of the present invention to render the resins more easily curable. Still further, a combination of both chemical treatment and thermo-curing can have been used on the resin.

The process of the present invention is applicable for treating a broad variety of articles both functional and decorative. For example, the articles of poly(arylene sulfide) can be mechanical parts and machine elements such as bearings, bushings, gaskets, gears, guides, runners, mountings, wear plates, and the like, and fibers, films, yarns, fabrics and the like. Similarly, articles coated with poly(arylene sulfide) can be wires, extrudates, trays, containers, baskets, cookware, bakeware, and the like.

The conditions under which the process of the present invention is carried out will vary according to the specific treating fluid used, and the desired results. Although the specific mechanisms involved in the chemical transformations of the present invention are not understood completely, there is, nevertheless, a direct relationship between the severity of the treatment and the level of the chemical change produced. The treatment severity depends upon the combination of operating parameters used in the process, namely, the temperature of treatment, the time of treatment, and the concentration of the treating agent in the treating fluid. Thus, it is clear that no single condition can alone control the level of the treatment severity.

Ordinarily, the treatment will range from about 1 minute to about 72 hours, preferably from about 5 minutes to about 50 hours. The treatment temperature will range from about 25° C. to about 150° C., preferably from about 50° to about 100° C. In those treating fluids which comprise a treating agent in a suitable solvent or diluent, the effective concentration of the treating agent in the treating fluid are as described above in the paragraph enumerating the applicable treating fluids. Ordinarily, pressures in the range of 0–500 psig are used. Operation at atmospheric pressure is convenient.

One skilled in the art will appreciate, of course, that with lower concentrations of the treating agent, higher temperatures and/or longer treatment times are used. Similarly, with lower temperature, higher concentrations and/or longer treating times are used. Again, with shorter treating times, higher concentrations and/or higher temperatures are used. Because there are several parameters available in the invention process, many suitable combinations of conditions can be chosen not only to obtain the result desired, but also to provide convenience and ease of operation. For example, high treating temperature with a low treatment time can be traded for a lower treatment temperature and a longer treatment time, if such is more convenient.

The contact of the treating fluid with the article comprising poly(arylene sulfide) resin can be carried out using any suitable mode, as immersion, and using any suitable apparatus that is compatible with the conditions described above. The contact can be carried out either batchwise or continuously.

The quantity of treating fluid with respect to the extent of surface of the article or articles being treated can vary widely. If desired, a measured amount of treating agent can be contacted with a measured amount of total surface area to be treated such as in a batch treatment operation. Alternatively, the articles to be treated can be contacted batchwise or continuously, with a large excess of the treating fluid under conditions which are sufficient to obtain the desired improvement. As will be illustrated later in the working examples, the specific amounts of treating agent or the specific conditions required to achieve the desired result can be easily determined by simple experimentation using a given poly(arylene sulfide) article and a given treating fluid.

Where the desired improvement is in surface hardness, such improvement will, of course, vary according to the intended application of the treated article. In general, it is desirable that the surface hardness of a coating or molded article be increased by at least one pencil hardness unit at 550° F.

The pencil hardness test is carried out by firmly running a pencil of a given hardness over the surface of the test specimen. The pencil mark is erased to determine whether a groove was formed. If no groove is observed, another pencil next in the series of greater hardness is used. The hardness of the specimen is considered to be the first pencil hardness which produces a groove. Thus, a test specimen which can be grooved with a #3H or harder pencil after treatment according to the present invention and which could be grooved with a #2H pencil before such treatment, exhibits an increase in surface hardness of one pencil unit, at a given test temperature.

After sufficient contact with the treating fluid, the article is separated from the excess treating agent and/or diluent. Such separations can be carried out using any suitable procedure such as decantation, draining, and the like. It is generally advisable to wash the article with a suitable wash liquid such as water, followed by drying. Gaseous treating fluids are separated from the articles even more conveniently by using similar procedures. Residual amounts of treating gases can be removed by aeration, displacement with inert gases, mild heating, etc.

Spent treating fluids can be fortified, as required, by the addition of fresh treating agents, and recycled to the process. If desired, small amounts of wetting agents, such as conventional nonionic surfactants, can be added to the liquid treating fluids to improve wettability.

The invention treatment improves the surface of articles which are either fabricated form or coated with poly(arylene sulfide) resins by increasing the hardness of the surface at elevated temperatures such as 550° F. This is advantageous and desirable in those applications, such as in release coatings on cookware, or low-friction sliding surfaces or bearings which are exposed to high temperatures, where such properties as smoothness, hardness, and low friction are necessary for optimum performance. Still other applications include coated wires for the high-temperature service such as in heavy-duty electric motors and the like. It has been found that the present invention treatment maintains the integrity of the poly(arylene sulfide) coatings on wires even under severe conditions of temperature as high as 600° F.

Other advantages include improved color and lower surface wettability. It has been found that treating poly(arylene sulfide)-coated articles according to the present invention results in coatings which are lighter in color and exhibit lower surface wettability than the untreated coatings.

A poly(arylene sulfide) coating can be applied to a substrate such as steel, aluminum, titanium, copper and the like in a variety of ways. The coating can be applied to such substrate with the aid of a volatilizable diluent such as water or ethylene glycol. Diluent-free procedures such as powder spraying or fluid bed coating can also be used. When a diluent-free procedure is used, it is preferable that the substrate be heated before contact with the resin. After applying the resin, the coated article can be heated at an elevated temperature, from 450°–900° F. depending on the melting point of the poly(arylene sulfide), in an oxygen-contained atmosphere for about 1 minute to 24 hours, then treated with at least one of the fluid treating agents of the present invention.

In similar fashion, other articles can have been molded or formed using any conventional procedures prior to treatment with the process of the present invention. Thus, the articles can have been prepared by compression molding, extrusion, rolling, melt-spinning, and the like. Yarns and fabrics are formed from fibers using conventional methods of the textile art. After molding or forming, the articles can be subjected to a suitable thermal treatment, if desired, before undergoing the chemical treatment of the present invention.

With respect to the embodiment wherein a formed product of poly(phenylene sulfide) is made infusible, the advantages are self-evident. The infusibility of such formed articles as films, fibers, or the subsequent products such as yarns, ropes, and fabrics can still further expand the utility of such products. For example, such infusible z fibers can be used to prepare non-burning, non-melting clothing, upholstery, carpets, etc. Such infusible materials can be advantageous in the situations where, due to possible catastrophic conditions of elevated temperature, melting or flowing polymer is highly undesirable. Under extremely high temperature conditions the infusible products of the present invention have been found to decompose without appreciable softening or flowing.

The following examples illustrate the invention.

EXAMPLE I

A series of tests were carried out in which aluminum coupons (simulating aluminum bakeware) coated with poly(phenylene sulfide) resin (PPS) were subjected to contact with hydrogen peroxide in acetic acid under varying conditions of time. The PPS coating was sprayed on the coupons using a ball-milled aqueous slurry of 100 parts PPS, 33 parts titanium dioxide pigment and 20 parts polytetrafluoroethylene (PTFE) by weight. A small amount of a nonionic surfactant (Triton X-100) was also present in the slurry. The coating, about 1 to 1½ mils in thickness, was cured to an adherent film on the aluminum coupons by heating for 30 minutes at 700° F. in air.

The PPS resin which was used in the release coating formulation was a virgin material which was produced by the reaction of para-dichlorobenzene and sodium sulfide in the presence of N-methyl-2-pyrrolidone at about 500° F. using procedures described in U.S. Pat. No. 3,354,129. The PPS resin powder had a melting point of about 545° F.

A number of such coated 4½ inch by 1¼ inch coupons were immersed halfway into a solution prepared by diluting 100 ml of 30 percent aqueous hydrogen peroxide with 200 ml glacial acetic acid. Coupons were withdrawn at various intervals and examined. The results are shown in the following Table I.

TABLE I

| Contact Time. Min. | 550° F. Hardness[1] | | Color | | Contact Angle[2] | | Liquid |
|---|---|---|---|---|---|---|---|
| | Treated | Untreated | Treated | Untreated | Treated | Untreated | |
| 15 | Good | Poorer | Very light tan | Tan-brown | 120° | 110° | Water |
| 15 | " | " | Very light tan | " | 76° | 73° | Oil[3] |
| 30 | " | " | Very light tan | " | 128° | 113° | Water |
| 30 | " | " | Very light tan | " | 79° | 74° | Oil |
| 45 | " | " | Very light tan | " | 118° | 108° | Water |
| 45 | " | " | Very light tan | " | 80° | 72° | Oil |
| 60 | " | " | Very light tan | " | 119° | 110° | Water |
| | | | Very | | | | |

TABLE I-continued

| Contact Time. Min. | 550° F. Hardness[1] Treated | 550° F. Hardness[1] Untreated | Color Treated | Color Untreated | Contact Angle[2] Treated | Contact Angle[2] Untreated | Liquid |
|---|---|---|---|---|---|---|---|
| 60 | " | " | light tan | " | 79° | 72° | Oil |

[1]The coated coupon was heated to 550° F. on a hotplate and a No. 3H pencil was run across the coating. A poorer hardness rating signifies that the pencil provided a groove in the coating while a good rating signifies that no groove was produced.
[2]As determined using a Rame-Hart Model A-100 Goniometer.
[3]A commercial liquid shortening (Wesson Oil).

The data in Table I show that the invention treatment increased the surface hardness of the coatings by at least one pencil hardness unit. The data also show improvements in color.

EXAMPLE II

A number of one-foot lengths of about #10 copper wire which had been extrusion-coated with molding grade poly(phenylene sulfide) resin were subjected to a series of tests according to the process of the present invention.

Two specimens of coated wire were contacted with a 5.25 percent aqueous solution of sodium hypochlorite for 30 minutes at 80° C. and two other specimens were contacted with the same solution for 60 minutes at 80° C. Similarly, two specimens were contacted with a solution prepared from 200 ml glacial acetic acid and 100 ml of 30 percent aqueous hydrogen peroxide for 15 minutes at 50° C. Two more specimens were contacted with the same solutions for 30 minutes at 50° C. The coated wire specimens which had been treated in this manner were found to be harder and more brittle than an untreated control.

One specimen from each of the above sets, plus an untreated control specimen, were then subjected to 600° F. for 15 minutes. The untreated control specimen suffered sagging of the coating to the extent that the wire was exposed in places. All of the treated specimens, on the other hand, exhibited no sagging and the coating remained infusible and unbroken.

The control specimen and the 30-minute and the 60-minute sodium hypochlorite-treated specimens which had been heated 15 minutes at 600° F. as described in the preceding paragraph were further subjected to 450° F. for 2 hours. At the end of this period, the untreated control specimen was found to be very brittle and cracked readily with every bend. The 30-minute treated specimen was less brittle and cracked on about ½ of the bends. The 60-minute treated specimen was partly brittle and cracked on every bend, but was not nearly so bad as the untreated control.

These data indicate that the invention treatment increases the hardness of the PPS coating on the coated wire and increases the thermal stability of the coated wire such that it survives exposure to relatively high temperature without separation of the coating from the wire.

EXAMPLE III

In a manner similar to that of Example II, specimens of the PPS-coated wire were treated by soaking 15 minutes in aqueous 5.25 percent sodium hypochlorite at 80° C. Still another group of specimens were treated in like manner for 30 minutes.

One specimen from each of the above sets, and one untreated control specimen, were exposed to 600° F. for 15 minutes. Similarly, one specimen from each set, and a control specimen, were exposed to 700° F. for 15 minutes. Examination showed that the coating on the treated specimen did not sag during the heating either at 600° F. or at 700° F., whereas the coatings on the untreated specimens sagged badly, exposing bare wire in places.

The treated specimens which had been heated at 600° F. and 700° F. were further heated at 450° F. for 2 hours. The specimens which had been exposed to 600° F. for 15 minutes were brittle. Those which had been exposed to 700° F. were not brittle.

EXAMPLE IV

A series of runs was carried out in which PPS fiber was subjected to various invention chemical treatments to render the fiber infusible. The PPS fiber was a monofilament of 19.5 denier, and exhibited a tenacity of 3.1 gpd (grams per denier), an elongation of 30 percent, and an initial modulus of 54 gpd. It had been melt spun from a resin prepared in a sodium acetate-modified polymerization reaction and had undergone some thermal curing.

Samples of the PPS fiber were rolled into small hanks and exposed to the invention treating fluids at room temperature for up to 63 hours. Following the treating period, the fiber hanks were washed, dried, and a sample of the treated fiber was heated to 700° F. for one hour. Similarly, samples of PPS fiber were subjected to treatment with other chemical agents, several of which are not within the scope of this invention.

The conditions and the results of these runs are shown in Table II below.

TABLE II

Chemical Treatment of PPS Fiber at Room Temperature

| Run | Treating Agent | Time | Condition at 700° F. |
|---|---|---|---|
| 1 | 25% $H_2O_2$ (39%) in acetic acid | 17 hr | no melting |
| 2 | 5-6% aqueous NaOCl | 17 hr | no melting |
| 3 | sulfuryl chloride | 63 hr | some melting |
| 4 | 5% aqueous $KM_nO_4$ | 63 hr | softened |
| 5 | 96% sulfuric acid | 63 hr | some melting |
| 6 | saturated chlorine-water | 17 hr | no melting |
| 7 | 2% $Cl_2$ in acetic acid | 17 hr | no melting |
| 8 | $Cl_2$ in moist atmosphere | 17 hr | no melting |
| 9 | gaseous $NO_2$ | 63 hr | no melting |
| 10 | 25% aqueous $CrO_3$ | 63 hr | some melting |
| 11 | 25% aqueous $NaBrO_3$ | 63 hr | melted |
| 12 | 10% $Br_2$ in acetic acid | 63 hr | melted |
| 13 | 25% aqueous $(NH_4)_2S_2O_8$ | 63 hr | melted |
| 14 | dimethyl sulfoxide | 63 hr | melted |
| 15 | 10% aqueous $FeCl_3$ | 63 hr | melted |
| 16 | 70% $HNO_3$ (disintegrated during treatment) | 17 hr | |
| 17 | 25% $H_2O_2$ (30%) in methanol | 17 hr | melted |
| 18 | 25% $H_2O_2$ (30%) in water | 17 hr | melted |
| 19 | glacial acetic acid | 17 hr | melted |
| 20 | $NO_2$ in acetic acid | 17 hr | melted |
| 21 | $NO_2$ in water | 17 hr | melted |

In Table II, Runs 1 through 10 are invention runs in which the designated treating fluids, at the indicated conditions, were effective in converting the PPS fibers, which normally melted at about 545° F., to a fiber which was essentially infusible at 700° F. Runs 11 through 21 in Table II are examples of chemical treatments which, at least under the conditions indicated, did not convert the fusible PPS fiber to an infusible fiber.

EXAMPLE V

Still another series of runs was carried out in which PPS fiber, PPS fabric, or PPS film was contacted with the invention treating solutions under varying conditions of time, temperature, and concentration of treating agent. In every case there was an excess of treating agent present. The runs were designed to show the effects of time, temperature and concentration only.

The essential conditions and the results of these runs are shown in Table III below.

TABLE III

Chemical Treatments of Poly(phenylene Sulfide) Fiber,
Fabric, or Film with Varied Times, Temperatures and Concentrations

| Run | Treating Fluid | PPS | Time | Temp. °C. | Condition at 700° F. |
|---|---|---|---|---|---|
| 1 | 25% H$_2$O$_2$ (30%) in acetic acid | fiber | 1 min. | 95 | no melting |
| 2 | | " | 5 min. | 60 | no melting |
| 3 | | " | 5 min. | 50 | no melting (shrunken) |
| 4 | | " | 5 min. | 42 | melted |
| 5 | | " | 30 min. | R.T. | softened (shrunken) |
| 6 | | " | 1 hr. | R.T. | no melting (shrunken) |
| 7 | | " | 17 hr. | R.T. | no melting at 900° F. |
| 8 | | " | 3 hr. | R.T. | no melting |
| 9 | 5% H$_2$O$_2$ (30%) in acetic acid | " | 17 hr. | R.T. | no melting |
| 10 | | fabric[1] | 15 min. | 50 | melted |
| 11 | | " | 30 min. | 50 | no melting |
| 12 | 25% H$_2$O$_2$ (30%) in acetic acid | film[2] | 1 hr. | 50 | no melting |
| 13 | 25% H$_2$O$_2$ (30%) in acetic acid | braid[3] | 2 hr. | 50 | no melting |
| 14 | 5-6% NaOCl in water | fabric[1] | 17 hr. | R.T. | melted |
| 15 | | " | 3 da. | R.T. | no melting |
| 16 | | " | 0.5 hr. | 95 | no melting |
| 17 | | " | 0.5 hr. | 50 | melted |
| 18 | | " | 2 hr. | 50 | no melting |
| 19 | | " | 0.5 hr. | 70 | no melting |
| 20 | | film[2] | 1 hr. | 70 | no melting |

[1]Chemical treatment applied to PPS fabric knitted from 12 strand, 2-ply yarn of 209 denier, 1.8 gpd tenacity, 30-62% elongation, and 36 gpd initial modulus.
[2]Chemical treatment applied to PPS film (about 1.5 mil).
[3]Chemical treatment applied to PPS Braid (5/16 in. diameter, 3 strand).

The results of the data in Table III show that the effectiveness of the invention chemical treatment responds to such variables as time, temperature, and concentration of treating agent. That is, relatively mild conditions (short time, low temperature, low concentration), produce little or no change in the fusibility of the fiber whereas relatively severe conditions can achieve the desired result. The data also show that various combinations of such conditions can be used. Thus, low treating temperature can be traded for longer treating times. Similarly, low treating agent concentrations can be traded for longer treating times.

Reasonable variations and modifications, which will be apparent to those skilled in the art, can be made in this invention without departing from the spirit and scope thereof.

What is claimed is:

1. A process for rendering infusible an article of manufacture selected from the group consisting of films, fibers, yarns, ropes and fabrics and having at least a portion of the surface thereof formed of an arylene sulfide polymer, which comprises contacting the surface of said article of manufacture under liquid conditions with a treating agent selected from the group consisting of hydrogen peroxide in acetic acid, alkali earth metal hypochlorites and alkali metal hypochlorites under conditions of concentration of treating agent, time and temperature to render the resulting treated article of manufacture infusible and thereafter separating the resulting infusible article of manufacture from said treating agent.

2. The process of claim 1 wherein said article is a film.

3. The process of claim 1 wherein said article is a fiber.

4. The process of claim 1 wherein said polymer is poly(phenylene sulfide).

5. The process of claim 1 wherein said treating agent is sodium hypochlorite.

6. The process of claim 1 wherein said temperature ranges from about 25 to about 150° C., said time is in the range of about 1 minute to about 72 hours and said concentration of said treating agent ranges from about 0.5 weight percent to saturation.

7. The process of claim 1 wherein said treating agent is hydrogen peroxide in acetic acid.

* * * * *